US012627755B2

(12) United States Patent
 Chen et al.

(10) Patent No.: US 12,627,755 B2
(45) Date of Patent: May 12, 2026

(54) METHOD OF USING MOBILE DEVICE AS DASHBOARD OF MOTORCYCLE AND MOTORCYCLE USING THE SAME

(71) Applicant: Kinpo Electronics, Inc., New Taipei City (TW)

(72) Inventors: Yu Chi Chen, New Taipei City (TW); Hsien Chung Chen, New Taipei City (TW); Sheng-Chang Wu, New Taipei City (TW)

(73) Assignee: Kinpo Electronics, Inc., New Taipei City (TW)

( * ) Notice: Subject to any disclaimer, the term of this patent is extended or adjusted under 35 U.S.C. 154(b) by 290 days.

(21) Appl. No.: 18/170,509

(22) Filed: Feb. 16, 2023

(65) Prior Publication Data

US 2023/0339322 A1    Oct. 26, 2023

(30) Foreign Application Priority Data

Apr. 21, 2022    (CN) .......................... 202210423070.2

(51) Int. Cl.
 *H04M 1/72409* (2021.01)
 *B60K 35/85* (2024.01)
(52) U.S. Cl.
 CPC ....... *H04M 1/724098* (2022.02); *B60K 35/85* (2024.01)
(58) Field of Classification Search
 CPC ........ B60K 2360/566; B60K 2360/573; B60K 2360/834; B60K 35/00; B60K 35/85; H04M 1/724098
 See application file for complete search history.

(56) References Cited

U.S. PATENT DOCUMENTS

| | | | | |
|---|---|---|---|---|
| 6,718,425 | B1 * | 4/2004 | Pajakowski | ........ G05B 23/0283 |
| | | | | 710/303 |
| 10,812,645 | B2 * | 10/2020 | Montez | ................... H04M 1/04 |

(Continued)

FOREIGN PATENT DOCUMENTS

| | | | | |
|---|---|---|---|---|
| AT | 523308 | A1 * | 7/2021 | ............. B60K 35/00 |
| CN | 101855120 | B * | 7/2012 | ......... B60R 16/0373 |

(Continued)

OTHER PUBLICATIONS

"Office Action of China counterpart Application", issued on Sep. 18, 2025, p. 1-p. 9.

*Primary Examiner* — Babar Sarwar
(74) *Attorney, Agent, or Firm* — JCIPRNET

(57) ABSTRACT

A method of using a mobile device as a dashboard of a motorcycle and a motorcycle using the method are provided. The motorcycle includes a body, an electronic control unit (ECU), a protocol converter, and a transceiver. The body includes a steering wheel, and the steering wheel includes a placement space for disposing a mobile device. The ECU is installed in the body and outputs a first signal via a first protocol. The protocol converter is installed in the body and coupled to the ECU. The protocol converter converts the first signal from the first protocol to a second protocol so as to generate a second signal, and the second protocol is different from the first protocol. The transceiver is installed in the body and coupled to the protocol converter. The transceiver transmits the second signal to the mobile device in the placement space.

17 Claims, 3 Drawing Sheets

(56) References Cited

U.S. PATENT DOCUMENTS

| | | | | |
|---|---|---|---|---|
| 11,062,149 B2 * | 7/2021 | Seko | | B62J 45/40 |
| 11,533,614 B1 * | 12/2022 | Russell | | H04W 4/02 |
| 11,652,663 B1 * | 5/2023 | Driscoll | | H04L 12/42 |
| | | | | 370/400 |
| 11,712,032 B2 * | 8/2023 | Elgart | | B05B 12/122 |
| | | | | 382/110 |
| 12,049,278 B2 * | 7/2024 | Di Tanna | | B60K 35/50 |
| 2012/0315845 A1 * | 12/2012 | Buczek | | H04M 1/72412 |
| | | | | 455/41.1 |
| 2014/0106712 A1 * | 4/2014 | Scholz | | H04L 12/40006 |
| | | | | 455/411 |
| 2014/0173155 A1 * | 6/2014 | Slattery | | G06F 1/1632 |
| | | | | 710/303 |
| 2014/0297674 A1 * | 10/2014 | Rhee | | B60K 35/60 |
| | | | | 715/740 |
| 2015/0148097 A1 * | 5/2015 | Kawasaki | | H04W 36/24 |
| | | | | 455/552.1 |
| 2016/0014206 A1 * | 1/2016 | Isobe | | H04W 4/80 |
| | | | | 455/557 |
| 2016/0205521 A1 * | 7/2016 | Kim | | G01C 21/26 |
| | | | | 701/36 |
| 2018/0095585 A1 * | 4/2018 | Kumon | | B60K 35/29 |
| 2018/0236873 A1 * | 8/2018 | Nguyen | | B60R 11/0241 |
| 2018/0334216 A1 * | 11/2018 | Montez | | B62J 50/225 |
| 2019/0381860 A1 * | 12/2019 | Credo | | G08B 5/00 |
| 2021/0037340 A1 * | 2/2021 | Mozayeni | | H04W 4/026 |
| 2021/0103367 A1 * | 4/2021 | Havins | | G06F 3/0481 |
| 2021/0188389 A1 * | 6/2021 | Ott | | G07C 5/008 |
| 2021/0245601 A1 * | 8/2021 | Giraud | | B60K 35/60 |
| 2021/0261073 A1 * | 8/2021 | Lee | | H04L 41/0806 |
| 2022/0024476 A1 * | 1/2022 | Lund | | B60K 35/80 |
| 2022/0063746 A1 * | 3/2022 | Song | | B62J 50/225 |
| 2022/0196215 A1 * | 6/2022 | Selevan | | F21L 4/08 |
| 2022/0227444 A1 * | 7/2022 | Di Tanna | | B60K 35/50 |
| 2022/0247681 A1 * | 8/2022 | Melgangolli | | H04L 12/40 |
| 2022/0303385 A1 * | 9/2022 | Hsieh | | H04W 4/48 |
| 2022/0311468 A1 * | 9/2022 | Stephens | | H04W 4/80 |
| 2022/0371867 A1 * | 11/2022 | Grothaus | | B66F 9/07581 |
| 2023/0041105 A1 * | 2/2023 | Santucci | | B60K 35/80 |
| 2023/0064633 A1 * | 3/2023 | Pienaar | | G06F 3/167 |

FOREIGN PATENT DOCUMENTS

| | | | | | | |
|---|---|---|---|---|---|---|
| CN | 103963910 | A | * | 8/2014 | | B62M 6/45 |
| CN | 204856914 | U | * | 12/2015 | | |
| CN | 105245743 | A | * | 1/2016 | | G06F 1/1698 |
| CN | 105791376 | A | * | 7/2016 | | H04L 67/12 |
| CN | 206552096 | U | * | 10/2017 | | |
| CN | 110203147 | A | * | 9/2019 | | B60R 11/02 |
| CN | 110572520 | A | * | 12/2019 | | H04M 1/72406 |
| CN | 211336146 | U | * | 8/2020 | | |
| CN | 114051474 | A | | 2/2022 | | |
| CN | 114475769 | A | * | 5/2022 | | B60K 20/02 |
| CN | 114666363 | A | * | 6/2022 | | H04L 67/12 |
| CN | 116968852 | A | * | 10/2023 | | H04M 1/724098 |
| DE | 202014105749 | U1 | * | 2/2015 | | B62J 50/20 |
| KR | 20230091839 | A | * | 6/2023 | | B60W 40/09 |
| TW | M446114 | U | | 2/2013 | | |
| TW | M621202 | | | 12/2021 | | |
| WO | WO-2014205345 | A2 | * | 12/2014 | | H04M 1/724098 |
| WO | WO-2018056819 | A2 | * | 3/2018 | | B62K 19/16 |
| WO | WO-2020240411 | A1 | * | 12/2020 | | B60K 35/80 |

* cited by examiner

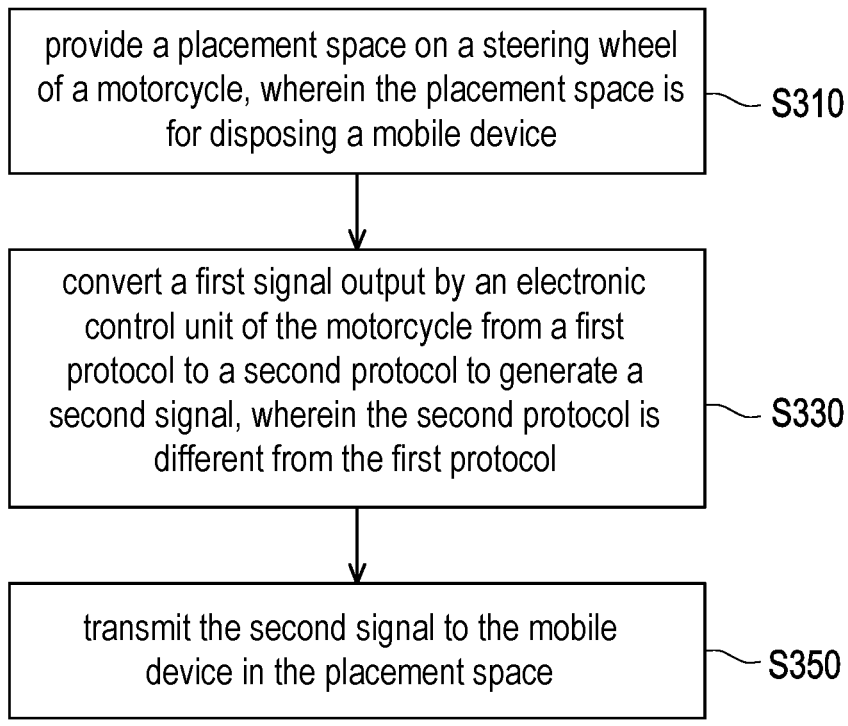

provide a placement space on a steering wheel of a motorcycle, wherein the placement space is for disposing a mobile device ⟩— S310 convert a first signal output by an electronic control unit of the motorcycle from a first protocol to a second protocol to generate a second signal, wherein the second protocol is different from the first protocol ⟩— S330 transmit the second signal to the mobile device in the placement space ⟩— S350

FIG. 3

METHOD OF USING MOBILE DEVICE AS DASHBOARD OF MOTORCYCLE AND MOTORCYCLE USING THE SAME

CROSS-REFERENCE TO RELATED APPLICATION

This application claims the priority benefit of China application serial no. 202210423070.2, filed on Apr. 21, 2022. The entirety of the above-mentioned patent application is hereby incorporated by reference herein and made a part of this specification.

BACKGROUND

Technical Field

The disclosure relates to a method of using a mobile device as a dashboard of a motorcycle and a motorcycle using the method.

Description of Related Art

At present, most motorcycles in the market use digital dashboards in place of traditional dashboards. A digital dashboard provides more functions such as displaying speed or time in numbers compared to the traditional dashboard. However, the digital dashboard is more expensive, and adopting the digital dashboard may result in an increase in the manufacturing cost of the motorcycle. In addition, when the digital dashboard is damaged, it often costs the consumers a lot of money to replace the entire digital dashboard, which imposes a financial burden on the consumers.

SUMMARY

The disclosure provides a motorcycle using a mobile device as a dashboard of the motorcycle and a method of using the mobile device as the dashboard of the motorcycle, which reduces production and development costs of the motorcycle.

According to an embodiment of the disclosure, a motorcycle using a mobile device as a dashboard includes a body, an electronic control unit, a protocol converter, and a transceiver. The body includes a steering wheel, and the steering wheel includes a placement space for disposing the mobile device. The electronic control unit is installed in the body and outputs a first signal via a first protocol. The protocol converter is installed in the body and coupled to the electronic control unit. The protocol converter converts the first signal from the first protocol to a second protocol so as to generate a second signal, and the second protocol is different from the first protocol. The transceiver is installed in the body and coupled to the protocol converter. The transceiver transmits the second signal to the mobile device in the placement space.

In an embodiment of the disclosure, a groove on the steering wheel forms the placement space.

In an embodiment of the disclosure, the groove includes a groove bottom and a sidewall. The motorcycle further includes a connector coupled to the transceiver, and the connector is provided on the sidewall for connecting to the mobile device in the placement space.

In an embodiment of the disclosure, the connector includes one of a universal serial bus connector and a Lightning connector.

In an embodiment of the disclosure, the groove includes a groove bottom and a sidewall, and the motorcycle further includes a shock-absorbing element provided in the groove bottom.

In an embodiment of the disclosure, the motorcycle further includes a waterproof cover covering the groove.

In an embodiment of the disclosure, the motorcycle does not have a dashboard.

In an embodiment of the disclosure, the first protocol is a controller area network protocol.

In an embodiment of the disclosure, the second protocol includes one of a Wi-Fi protocol, a Bluetooth protocol, and a universal serial bus protocol.

According to an embodiment of the disclosure, a method of using a mobile device as a dashboard of a motorcycle includes the following. A placement space is provided on a steering wheel of the motorcycle for disposing the mobile device. A first signal output by an electronic control unit of the motorcycle is converted from a first protocol to a second protocol so as to generate a second signal, and the second protocol is different from the first protocol. The second signal is transmitted to the mobile device in the placement space.

In an embodiment of the disclosure, a groove on the steering wheel forms the placement space.

In an embodiment of the disclosure, the groove includes a groove bottom and a sidewall. The method further includes: providing a connector on the sidewall for connecting to the mobile device in the placement space, and the connector is coupled to a transceiver.

In an embodiment of the disclosure, the connector includes one of a universal serial bus connector and a Lightning connector.

In an embodiment of the disclosure, the groove includes a groove bottom and a sidewall. The method further includes: providing a shock-absorbing element in the groove bottom.

In an embodiment of the disclosure, the method further includes: covering the groove with a waterproof cover.

In an embodiment of the disclosure, the motorcycle does not have a dashboard.

In an embodiment of the disclosure, the first protocol is a controller area network protocol.

In an embodiment of the disclosure, the second protocol includes one of a Wi-Fi protocol, a Bluetooth protocol, and a universal serial bus protocol.

Based on the above, the disclosure provides the placement space for disposing the mobile device on the steering wheel of the motorcycle. The mobile device may be connected to the electronic control unit through the connector in the placement space to obtain the signal from the electronic control unit. The mobile device may display information associated with the motorcycle according to the signal received to replace the functions of a dashboard.

BRIEF DESCRIPTION OF THE DRAWINGS

FIG. 3 is a flowchart illustrating a method of using a mobile device as a dashboard of a motorcycle according to an embodiment of the disclosure.

DESCRIPTION OF THE EMBODIMENTS

Figure 1:
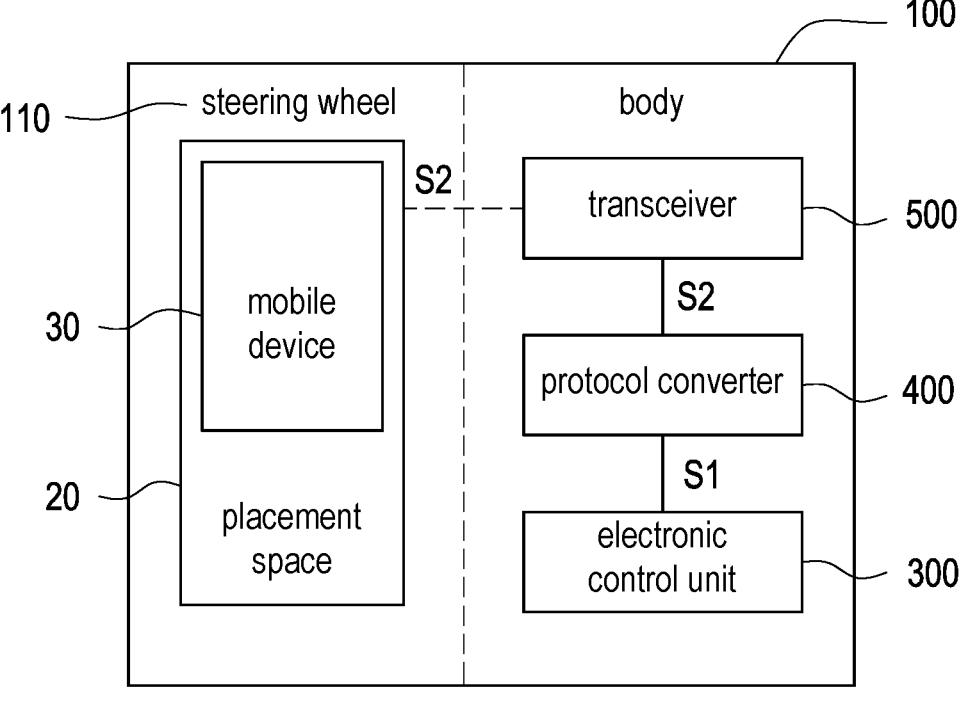
FIG. 1 is a schematic diagram illustrating a motorcycle according to an embodiment of the disclosure.

In order to make the disclosure more comprehensible, the following embodiments are particularly presented as examples showing that the disclosure can actually be implemented. In addition, wherever possible, elements/components/steps using the same reference numerals in the drawings and embodiments represent the same or similar elements/components/steps.

FIG. 1 is a schematic diagram illustrating a motorcycle 10 according to an embodiment of the disclosure. The motorcycle 10 may not be provided with a dashboard to reduce production and manufacturing costs. The motorcycle 10 may include a body 100, and the body 100 may include a steering wheel 110. The motorcycle 10 may further include an electronic control unit (ECU) 300, a protocol converter 400, and a transceiver 500 provided in the body 100, and the protocol converter 400 may be coupled to the ECU 300 and the transceiver 500.

The ECU 300 is, for example, a central processing unit (CPU) or a programmable general purpose or special purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar devices or a combination of the above devices.

The ECU 300 may be coupled to a sensor of the motorcycle to obtain sensing data, and control the motorcycle 10 according to the sensing data. For instance, the sensor includes, for example, a liquid level sensor provided in a fuel tank of the motorcycle 10. The ECU 300 may output a signal for displaying the fuel level on a mobile device 30 according to the sensing data from the liquid level sensor. The ECU 300 may output a signal S1 (or called "a first signal") according to a controller area network (CAN) protocol.

The protocol converter 400 may receive the signal S1 from the ECU 300, and convert the signal S1 from the CAN protocol to a communication protocol supported by the mobile device, thereby generating a new signal S2 (or called "a second signal"). The communication protocol of the signal S2 may include, for example, a Wi-Fi protocol, a Bluetooth protocol, or a universal serial bus (USB) protocol. The protocol converter 400 may output the signal generated to the transceiver 500.

The transceiver 500 transmits and receives a signal in a wireless or wired manner. The transceiver 500 may also perform, for example, low noise amplification, impedance matching, frequency mixing, upward or downward frequency conversion, filtering, amplification and similar operations. The transceiver 500 may receive the signal S2 from the protocol converter 400 and forward the signal S2 received to the mobile device 30 (for example, a device such as a mobile phone and a tablet) disposed in a placement space 20 through wired or wireless communication. The signal S2 may include information associated with a dashboard of the motorcycle 10. The information includes, for example, a turn signal indicator light, an engine failurelight, a neutral indicator light and/or a gear display, an oil change indicator light, a high beam indicator light, speed, RPM, fuel level, time, RPM limit light, mileage, etc.

Figure 2:
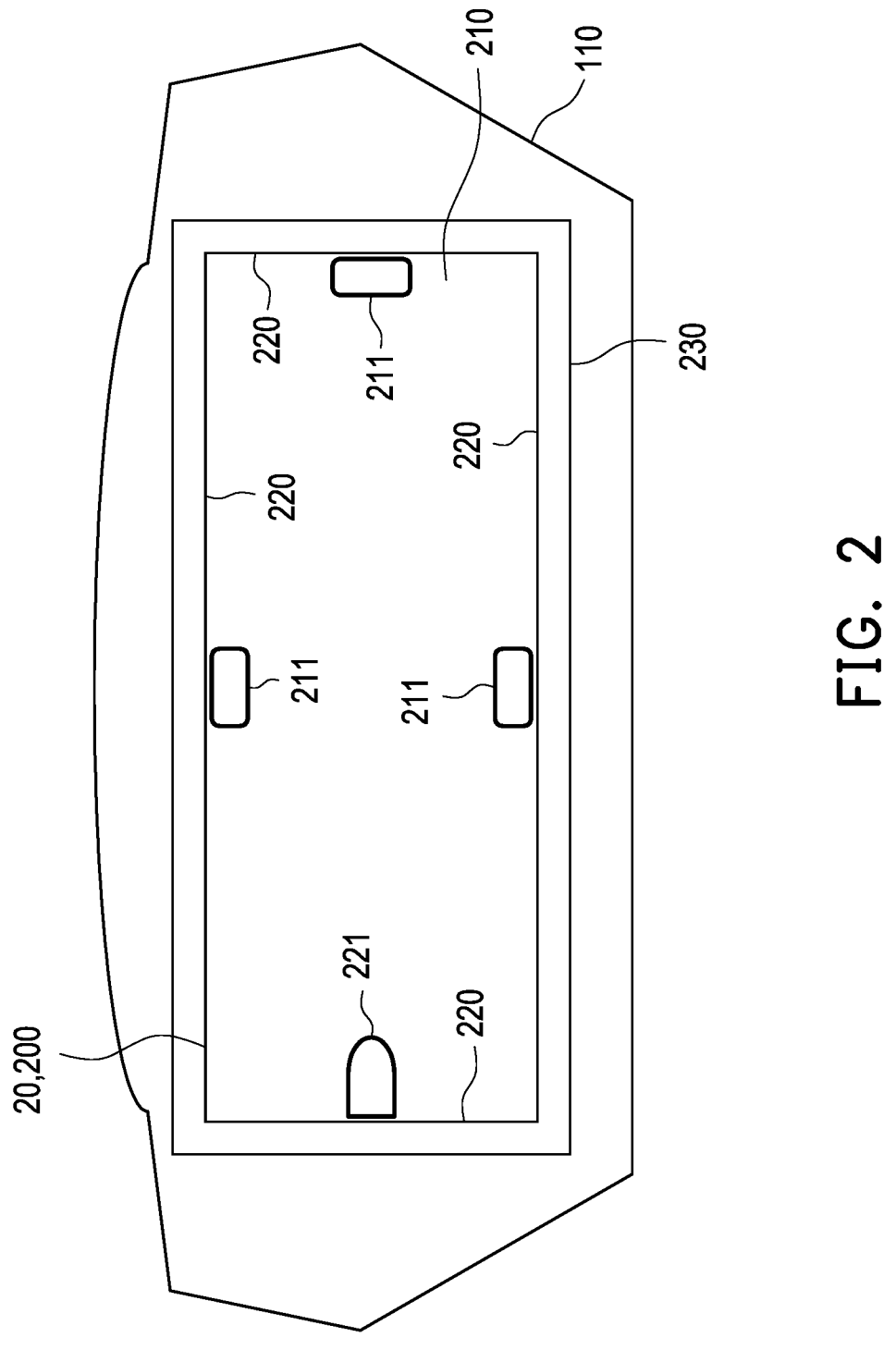
FIG. 2 is a schematic diagram illustrating a steering wheel according to an embodiment of the disclosure.

FIG. 2 is a schematic diagram illustrating the steering wheel 110 according to an embodiment of the disclosure. The steering wheel 110 may include the placement space 20 for installing a mobile device (not shown in the figure). The placement space 20 is, for example, formed by a groove 200 on the steering wheel 110. The groove 200 may include a groove bottom 210 and sidewalls 220 provided around the groove bottom 210. The groove bottom 210 may have an area slightly larger than an area of the mobile device, so as to form the placement space 20 where the mobile device is disposed and fixed.

The number of the sidewalls 220 may be associated with a shape of the groove bottom 210 or the mobile device. In this embodiment, the groove bottom 210 has a polygonal shape, and the number of the sidewalls 220 may be the same as the number of sides of the groove bottom 210. For example, in order to dispose a rectangular mobile device in the placement space 20, the shape of the groove bottom 210 may be designed as a rectangle. Accordingly, the number of the sidewalls 220 provided around the groove bottom 210 may be equal to four.

In this embodiment, in order to prevent the mobile device in the groove 200 from being damaged due to the vibration generated when the motorcycle 10 is running, one or more shock-absorbing elements 211 may be provided in the groove 200. The shock-absorbing element 211 may include an ethylene vinyl acetate (EVA) copolymer, polyurethane (PU), thermoplastic polyurethane (TPU), thermoplastic elastomer (TPE), rubber, etc.

In this embodiment, if the transceiver 500 transmits a signal to the mobile device in the placement space 20 through wired communication technology, one of the sidewalls 220 of the groove 200 may be provided with a connector 221. When a user puts the mobile device into the placement space 20, the connector 221 may be inserted into a charging hole of the mobile device. The connector 221 may be coupled to the transceiver 500, and when the mobile device in the placement space 20 is connected to the connector 221, the mobile device may receive the signal from the transceiver 500 through the connector 221. In addition, the ECU 300 may also provide power to the mobile device through the connector 221, so as to ensure that the mobile device has sufficient power to operate when the motorcycle is running. In this way, even if the transceiver 500 transmits the signal to the mobile device in a wireless manner, power may still be provided to the mobile device through the connector 221 (or a wireless charging device), so as to ensure that the mobile device has sufficient power to operate when the motorcycle is running. The connector 221 may include a universal serial bus connector (for example, a Type C connector or a Micro-B connector) or a Lightning connector.

In this embodiment, the motorcycle 10 may include a waterproof cover 230. The waterproof cover 230 may cover the groove 200. When the mobile device is disposed in the placement space 20, the waterproof cover 230 may prevent the mobile device from rain or dirty water. The disclosure does not limit how the waterproof cover 230 is installed. For example, the waterproof cover 230 may be fixed on a surface of the steering wheel 110 by a hook-and-loop fastener, so as to cover the groove 200. In one embodiment, a material of the waterproof cover is, for example, a high-density composite material containing graphene or other conductive composite materials. In this way, even if the waterproof cover 230 covers the mobile device in the placement space 20, the user can still operate a touch screen of the mobile device through the waterproof cover 230.

FIG. 3 is a flowchart illustrating a method of using a mobile device as a dashboard of a motorcycle according to an embodiment of the disclosure. The method can be implemented by the motorcycle 10 shown in FIG. 1. In step S310, a placement space is provided on a steering wheel of the motorcycle, and the placement space is for disposing the mobile device. In step S330, a first signal output by an electronic control unit of the motorcycle is converted from a first protocol to a second protocol so as to generate a second signal, and the second protocol is different from the first protocol. In step S350, the second signal is transmitted to the mobile device in the placement space.

In summary, the disclosure provides the placement space for disposing the mobile device on the steering wheel of the motorcycle. The mobile device may be connected to the electronic control unit through the connector in the placement space to obtain the signal from the electronic control unit. The mobile device may display the information associated with the motorcycle according to the signal received to replace the functions of a dashboard. The mobile device may provide a rider with more functions (such as using the GPS function to record running tracks or navigating) than a traditional dashboard, so as to improve ride comfort for the rider. In addition, the dashboard is omitted from the motorcycle, which reduces production and development costs of the motorcycle, and achieves the purpose of energy saving and carbon reduction as well.

What is claimed is:

1. A motorcycle using a mobile device as a dashboard, the motorcycle comprising:

a body comprising a steering wheel, wherein the steering wheel comprises a placement space for disposing the mobile device;

an electronic control unit installed in the body, executed by a processor, to output a first signal via a first protocol;

a protocol converter installed in the body and coupled to the electronic control unit, wherein the protocol converter converts the first signal from the first protocol to a second protocol so as to generate a second signal, wherein the second protocol is different from the first protocol, wherein the first protocol is a controller area network (CAN) protocol, wherein the second signal includes information associated with the dashboard, and wherein the information includes a turn signal indicator light, an engine failure light, a neutral indicator light and/or a gear display, an oil change indicator light, a high beam indicator light, speed, RPM, fuel level, time, RPM limit light and mileage; and a transceiver installed in the body and coupled to the protocol converter, wherein the transceiver transmits the second signal to the mobile device in the placement space.

2. The motorcycle according to claim 1, wherein a groove on the steering wheel forms the placement space.

3. The motorcycle according to claim 2, wherein the groove comprises a groove bottom and a sidewall, wherein the motorcycle further comprises:

a connector coupled to the transceiver, wherein the connector is provided on the sidewall for connecting to the mobile device in the placement space.

4. The motorcycle according to claim 3, wherein the connector comprises one of a universal serial bus connector and a Lightning connector.

5. The motorcycle according to claim 2, wherein a shock-absorbing element is provided in the groove.

6. The motorcycle according to claim 2, further comprising:

a waterproof cover covering the groove.

7. The motorcycle according to claim 6, wherein the waterproof cover is a composite material containing graphene or conductive composite materials for user to operate a touch screen of the mobile device through the waterproof cover.

8. The motorcycle according to claim 1, wherein the motorcycle does not have a dashboard.

9. The motorcycle according to claim 1, wherein the second protocol comprises one of a Wi-Fi protocol, a Bluetooth protocol, and a universal serial bus protocol.

10. A method of using a mobile device as a dashboard of a motorcycle, the method comprising:

providing a placement space on a steering wheel of the motorcycle for disposing the mobile device;

converting a first signal output by a processor executing an electronic control unit of the motorcycle from a first protocol to a second protocol so as to generate a second signal, wherein the second protocol is different from the first protocol, wherein the first protocol is a controller area network (CAN) protocol, wherein the second signal includes information associated with the dashboard, and wherein the information includes a turn signal indicator light, an engine failure light, a neutral indicator light and/or a gear display, an oil change indicator light, a high beam indicator light, speed, RPM, fuel level, time, RPM limit light and mileage; and transmitting the second signal to the mobile device in the placement space.

11. The method according to claim 10, wherein a groove on the steering wheel forms the placement space.

12. The method according to claim 11, wherein the groove comprises a groove bottom and a sidewall, wherein the method further comprises:

providing a connector on the sidewall for connecting to the mobile device in the placement space, wherein the connector is coupled to a transceiver.

13. The method according to claim 12, wherein the connector comprises one of a universal serial bus connector and a Lightning connector.

14. The method according to claim 11, wherein a shock-absorbing element is provided in the groove.

15. The method according to claim 11, further comprising:

covering the groove with a waterproof cover.

16. The method according to claim 10, wherein the motorcycle does not have a dashboard.

17. The method according to claim 10, wherein the second protocol comprises one of a Wi-Fi protocol, a Bluetooth protocol, and a universal serial bus protocol.

\* \* \* \* \*